Aug. 3, 1954 P. LIDDICOAT 2,685,274
PNEUMATIC TOOL
Filed April 12, 1951

Inventor
PERCILL LIDDICOAT, DECEASED,
BY PHYLLIS E. LIDDICOAT, EXECUTRIX

Attys

Patented Aug. 3, 1954

2,685,274

UNITED STATES PATENT OFFICE 2,685,274

PNEUMATIC TOOL

Percill Liddicoat, deceased, late of Niagara-on-the-Lake, Ontario, Canada, by Phyllis E. Liddicoat, executrix, Niagara-on-the-Lake, Ontario, Canada Application April 12, 1951, Serial No. 220,582

1 Claim. (Cl. 121—32)

The present invention relates to a pneumatic tool and more particularly to a pneumatic tool provided with a resiliently mounted stop collar.

Pneumatic tools, such as conventionally employed in pneumatic power means, as for example in an air hammer, air chisel, and the like, are adapted to be forced against the workpiece by means of a fluid pressure-actuated piston which contacts the butt end of the tool to urge the same against the workpiece. To retain the tool within a guide housing, the tool is conventionally provided with an integrally formed collar which abuts a retaining flange at the end of the tool stroke. It will be appreciated that the tool collar is subjected to considerable shock as the tool is brought to an abrupt halt by contact with the retaining flange, and difficulty has been encountered in the prior art because of shearing or fracture of the tool collar due to metal fatigue under the extreme operating conditions to which the collar is subjected.

The present invention provides a novel, inexpensive, and easily manufactured tool provided with a resiliently mounted collar which is capable of absorbing the shock incident to the abrupt braking of the tool momentum by contact between the collar and the retaining portion of the actuating means.

More particularly, the present invention contemplates the replacing of the formerly employed integral collar with a resilient sleeve bonded or otherwise secured to the tool shank and projecting outwardly therefrom. A metal ferrule or collar is bonded to the outer extremity of the resilient collar, the ferrule being adapted to abut the retaining portions of the tool guiding means, thereby protecting the resilient collar from excessive wear, while the collar resiliently absorbs at least a portion of the shock imparted to the tool composite collar, so that the ferrule is not subjected to extreme fatigue stresses.

It is, therefore, an important object of the present invention to provide a pneumatic tool having a resilient collar capable of at least partially absorbing braking shocks imposed upon the tool.

Another important object of the present invention is to provide a pneumatic tool having an intermediate portion thereof surrounded by a resiliently mounted stop collar adapted to abut a retaining portion of a tool actuating means to prevent displacement of the tool from the actuating means without imposing fatigue stress upon the tool.

A further important object of the present invention is to provide an improved pneumatic tool having an annular resiliently absorbent sleeve bonded thereto and provided with an encircling metallic ferrule bonded to the sleeve, the ferrule serving to prevent wear on the collar and the collar serving to prevent the subjection of the ferrule to excessive fatigue stress.

It is still another important object of the present invention to provide an improved tool for utilization with a pneumatic actuating means having a stop flange for preventing tool displacement from the actuating means, the tool comprising an elongated tool shank having a resilient collar bonded thereto to encircle an intermediate portion thereof and a metallic sleeve encircling the collar and bonded thereto, the sleeve being adapted to abut the actuating means stop to prevent wear upon the collar and the collar being adapted to resiliently deflect from its normal configuration to absorb at least a portion of the stress generated in the composite collar structure upon an abrupt halting of tool actuating movement.

Other and further important objects of this invention will be apparent from the disclosures in the specification and the accompanying drawings.

Figure 1:
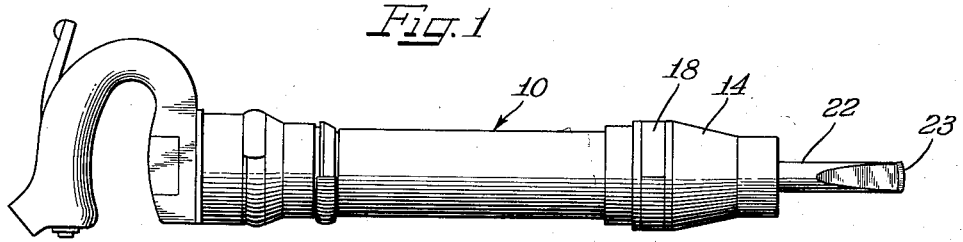
Figure 1 is a side elevational view of a pneumatic actuating means provided with a tool of the present invention.
Figure 2:
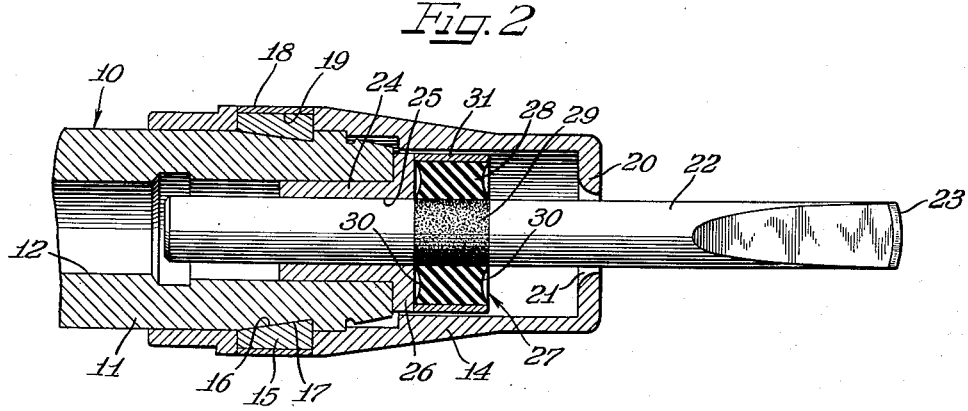
Figure 2 is a longitudinal sectional view, with parts shown in elevation, illustrating a tool of the present invention disposed within the actuating means of Figure 1.
Figure 3:
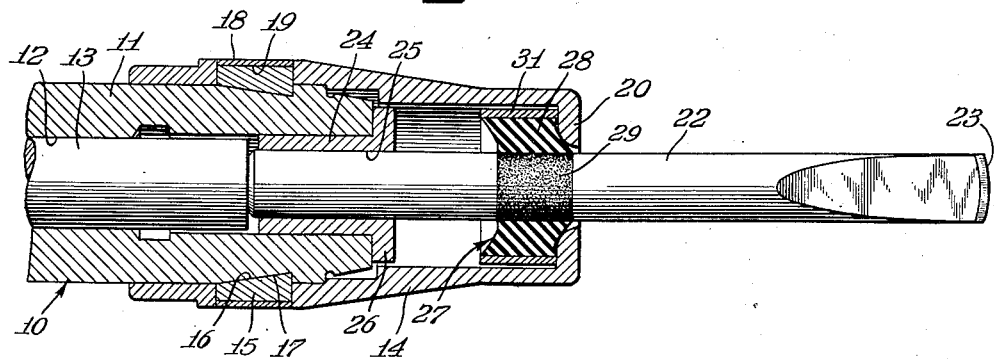
Figure 3 is an enlarged sectional view similar to Figure 2 illustrating the tool in an operating position.

In Figures 1-3, inclusive, reference numeral 10 refers generally to a pneumatic actuating means, such as a pneumatic riveting hammer or cutter, provided with a central open-ended barrel 11 having an elongated axial bore 12 within which an actuating piston 13 is disposed for reciprocatory movement. One end of the barrel 11 is closed by a retainer 14 secured in position upon the barrel by means of opposed latch blocks 15 extending through slots 16 formed in the barrel and having beveled inner faces, the latch blocks 15 having inner faces 17 which are beveled to engage the correspondingly shaped inner faces of the openings 16. The blocks 15 are yieldably retained in latching position by an arcuate spring 18 retained in a circumferential groove 19 formed on the exterior surface of the retainer 14.

The retainer 14 is provided with an inwardly projecting terminal flange 20 provided with a central opening 21 through which projects a pneumatic tool 22 of the present invention, the tool being provided with a sharpened cutting edge 23, although it will be appreciated that many different types of tools 22 may be utilized. The shank of the tool 22 projects into the barrel bore 12, and the tool is guided in the barrel by suitable means, as by an adapter bushing 24 which has a central bore 25 receiving the tool therethrough and a radially outwardly directed flange 26 abutting the corresponding open end of the barrel 11 in spaced relation to the flange 20, as best shown in Figure 2.

The tool 22 is provided with a collar 27 positioned intermediate the tool shank and comprising a resilient annular collar 28 adhesively secured, as at 29, or otherwise fastened to the shank 22. The collar 28 may be formed of a natural or synthetic rubber, or any other suitable natural or synthetic elastomer, and the collar (if rubber) may be vulcanized to the tool shank. It will be noted that the collar 28 is provided with concave annular end faces 30 for a reason to be hereinafter more fully described, and the collar is enclosed by a metallic or other rigid ferrule 31 which is concentric with the tool shank 22 and which is adhesively or otherwise secured to the outer peripheral surface of the collar 28.

It will be seen that the ferrule is bonded to the collar 28, and the collar 28 in turn is securely bonded to the tool shank 22, so that the collar 28 and the ferrule 31, in combination, define a composite collar which is utilized in place of the conventional integral collar formerly employed. The collar 27 is confined within the retainer 14, and the collar is capable of moving within the retainer with the tool 22, but the collar prevents displacement of the tool 22 from the actuating mechanism 10.

This function of the collar is best shown in Figure 3 of the drawings wherein the piston 13 is illustrated as having contacted the butt end of the tool 22 to cause the tool to project beyond its normal position of Figure 3. Upon movement of the tool 22, the composite collar 27 is moved therewith, and the collar, upon contacting the retainer flange 20, halts the forward movement of the tool. As illustrated in Figure 3, the inertia momentum of the tool 22 moving outwardly with respect to the actuating means will cause a distortion of the resilient collar 28, so that the resilient collar is distorted to absorb at least a portion of the shock which would normally be imparted to the tool and/or to the composite collar 27 by abrupt halting of the tool upon abutment of the collar with the flange 20.

It will be noted that the walls of opening 21 are chamfered or otherwise sloped, so that a smoothly rounded aperture contour is presented to prevent the presentation of any sharp edges to the resilient material. Actually, the resilient material may be deformed axially of the tool shank 22 into the opening 21. Upon abutment of the composite collar 27 with the flange 20, the ferrule or exterior ring 31 actually comes in contact with the flange initially inasmuch as the side faces of the collar portion 28 are concave, as hereinbefore described. In this manner, there is no abrasive contact between the resilient member 28 and the flange 20.

Thus, the ferrule takes the wear, while the resilient collar takes the shock by a resilient flexing movement thereof, and the entire composite collar 27 serves as a vibration damper for preventing the generation of excessive shock within the entire tool and actuating mechanism.

A desirable resilient collar 27 may be formed by assembling the tool 22 having an unvulcanized rubber collar 28 positioned thereon and an annular ferrule 31 encircling the collar 28. The assembly is then subjected to a vulcanizing or bonding temperature of 250–350° F. whereby simultaneous vulcanization of the collar 28 to the ferrule 31 and the shank 22 occurs and the completed assembly, as hereinbefore described, is formed.

It will be understood that modifications and variations may be effected without departing from the scope of the novel concepts of the present invention.

What is claimed is:

In a pneumatic apparatus including a barrel having a reciprocal piston therein, a guiding bushing, a stop flange spaced from said bushing, and a pneumatic tool having a shank portion guided by said bushing for actuation toward said flange by said piston, a composite collar on said tool and interposed between said bushing and said flange, comprising a resilient sleeve bonded to said shank and having concave end faces, and a rigid ferrule bonded to the outer surface of said sleeve and having end faces projecting beyond the concave faces of said sleeve for contacting said flange and said bushing to prevent abrasive contact of said sleeve therewith the said stop flange having an annular edge facing an end face of said sleeve and having a curvature which complements the curvature of the end face of said sleeve when deflected substantially to its maximum deformed impacted condition.

References Cited in the file of this patent

UNITED STATES PATENTS

| Number | Name | Date |
|---|---|---|
| 2,233,540 | Latshaw | Mar. 4, 1941 |

FOREIGN PATENTS

| Number | Country | Date |
|---|---|---|
| 332,914 | Great Britain | July 14, 1930 |
| 552,305 | Great Britain | Mar. 31, 1943 |
| 379,366 | Italy | Mar. 26, 1940 |

OTHER REFERENCES

Automobile Engineer, pages 196, 197; June 1941.